United States Patent Office 2,950,216
Patented Aug. 23, 1960

2,950,216

PROCESS FOR DRESSING LEATHER

Günter Kolb, Koln-Stammheim, and Kurt Eitel, Leverkusen, Germany, assignors to Farbenfabriken Bayer Aktiengesellschaft, Leverkusen, Germany, a corporation of Germany No Drawing. Filed June 1, 1955, Ser. No. 512,558

Claims priority, application Germany June 5, 1954

8 Claims. (Cl. 117—142)

The present invention relates to a process for dressing leather, using emulsions of copolymers based on butadiene.

The feature of the process is that the copolymers in the emulsion are based on at least 45% of butadiene or a homologue or derivative thereof, such as 2-methylbutadiene, 2,3-dimethylbutadiene, 2-chlorobutadiene, and also on 1,1-dichloroethene, and if desired additional vinyl compounds.

The content of 1,1-dichloroethene in the copolymers should preferably exceed 10%. Examples of the additional vinyl compounds which can if desired be used as a basis for the copolymer emulsions to be used in the process of the invention are styrene, acrylonitrile and also esters of acrylic acid and methacrylic acid.

The copolymer emulsions proposed herein for the purpose of dressing leather can be prepared in various ways, preferably in an aqueous medium. It is desirable to use copolymer emulsions into which long-chain paraffins, possibly those produced as described in German Patent 750,330, have been introduced as emulsifiers in the production thereof. The copolymer emulsions can, moreover, have been prepared with activators, for example with radical-forming substances or with Redox systems. Particular attention is to be drawn to copolymer emulsions which have been produced with the aid of activators consisting of aliphatic sulphinic acids which have a carbon chain corresponding in length to that of the soap fatty acids, without the addition of compounds yielding oxygen (cf. Makrom. Chem., vol. III, authors Heino Logemann and Wilhelm Becker, page 43, 1949). Furthermore, the thermoplastic properties of the copolymers to be used in the process of the invention can have been influenced by the addition of regulators in accordance with known processes.

It has further proved to be very advantageous to use copolymer emulsions to which stabilising agents have been added prior to or during the working up, more especially non-discolouring stabilising agents, such as, for example, condensation products of cresols with camphene, 2,6-ditert.-butyl-p-cresol, aralkylation products of diphenyl amine and, above all, 2,2'-methylenebis-(4-methyl-6-cyclohexylphenol). The amount of stabilising agent should amount to at least 0.5%, but not more than 5%, calculated on the polymer constituent of the emulsions.

Leather can be dressed with the proposed copolymer emulsions in the same manner as is known in connection with the dressing of leather with other copolymer emulsions, for example by mixing the emulsions with the conventional additives used in the dressing, for example with aqueous leather body colours, and applying the mixtures thus formed, for example by means of brushes or spray devices, to the leather to be treated.

The copolymer emulsions proposed herein are characterised in that they produce softer and more elastic dressings than the polymer emulsions formerly used for dressing leather. It is also to be noted that the dressings, obtained by means of the process of the invention have an exceptional breaking strength when applied to split leather. Another feature to be emphasised is the fine graining of the dressings, which makes them particularly suitable as leather for shoe uppers. In contrast to the dressings obtained with the butadiene-free polymer emulsions, the dressings which are produced on leather with the copolymer emulsions proposed herein have excellent bonding strength with high elongation.

It is surprising that the copolymer emulsions which are to be used in the process of the present invention for dressing leather and which contain 1,1-dichloroethene in addition to at least 45% of butadiene, immediately produce on the leather a non-tacky priming which can be used technically, whereas emulsions of copolymers which are known as synthetic rubber and which contain other polymerisable vinyl compounds instead of 1,1-dichloroethene, in addition to at least 45% of butadiene, produce tacky dressings which are of no value for practical purposes when they are used on leather, regardless of whether cross-linking is subsequently effected by vulcanisation.

The following examples, in which the parts indicated are parts by weight, further illustrate the invention, without however, limiting the scope thereof.

*Example 1*

100 parts of the substantially 30% copolymer emulsion which is hereinafter described is mixed by stirring with an aqueous body colour mixture of 100 parts of an aqueous leather body colour (see Bergmann and Grassman, "Handbuch der Gerbereichemie und Lederfabrikation," vol. III, part 1, page 43 et seq.) and the usual additives of lustering agents and plasticisers, and also 400–600 parts of water. Thus, as is shown in Bergmann et al., the leather body color is a standard one containing a binder which may be casein, albumen, shellac, etc., and a dyestuff which as a mineral dyestuff or an organic pigment dyestuff used in the lacquer industry. The mixture which is obtained is then applied by means of a brush, velvet board or spray device to dressed leather, for example to buffed cowhide, and dried. It is possible for a second application to be made in the same manner. A third application by means of a spray gun may produce better levelling of the layer of body colour. Finally, a finishing is applied in the usual manner. If desired, between the individual coatings, the aqueous layer of body colour can be hardened by spraying on a 10% formaldehyde solution. The dressing which is obtained has the advantages indicated in the descriptive part of this specification.

The copolymer emulsion which was used was prepared in the following manner: an emulsion was prepared by stirring 5500 parts of butadiene, 2500 parts of 1,1-dichloroethene, 2000 parts of acrylonitrile, 3500 parts of a 10% aqueous paraffin sulphonate solution, 300 parts of N sulphuric acid with 8900 parts of water. The mixture was then polymerised at 20° C. with the addition of 50 parts of a paraffin sulphinate as activator and 54 parts of diisopropyl xanthogen disulphide as regulator.

*Example 2*

100 parts of the copolymer emulsion hereinafter described were mixed by stirring with 100 parts of a body colour mixture as described in Example 1, with the addition of the usual lustering agents and plasticisers, and also 200–300 parts of water. The mixture was then applied once or twice by means of a brush or velvet board to a split leather. A sprayed coating of analogous composition levels the layer of body colour. After being dried in air, the leather is finished in the usual manner and if desired hardened with formaldehyde. The leather is ironed between the coatings and after the finishing can be provided with an artificial grained effect by embossing. The dressing which is obtained shows excellent breaking strength as well as good covering power.

The copolymer emulsion used was prepared by emulsifying and polymerising 5500 parts of butadiene, 2500 parts of 1,1-dichloroethene, 1000 parts of styrene and 1000 parts of acrylonitrile in the manner indicated in Example 1.

*Example 3*

50 parts of a copolymer emulsion as used in Example 1, are mixed with 50 parts of the emulsion described in German Patent 821,997. The emulsion is a 35–40% aqueous emulsion of the polymer in water, the polymer constituent of which consists of about 40% by weight of butadiene, 40% by weight of acrylonitrile and 20% by weight of styrene. After adding the body colour mixture indicated in Example 1, leather is dressed in the manner described in said example by means of the final mixture. The dressing obtained shows a good covering power and a fine graining.

We claim:

1. A process of dressing leather which comprises treating the leather with an aqueous emulsion of a copolymer of at least 45% by weight of a conjugated butadiene and at least 10% by weight of 1,1-dichloroethene.

2. The process of claim 1 wherein the copolymer emulsion contains as a non-discoloring stabilizer 0.5–5% by weight, based on the weight of the polymer, of 2,2'-methylene-bis-(4-methyl-6-cyclohexylphenol).

3. The process of claim 1 wherein the butadiene is selected from the group consisting of 2-methylbutadiene, 2,3-dimethylbutadiene, 2-chlorobutadiene, and butadiene.

4. The process of claim 1 wherein the copolymer contains at least one additional vinyl compound.

5. The process of claim 4 wherein the additional vinyl compound is styrene.

6. The process of claim 4 wherein the additional vinyl compound is acrylonitrile.

7. The process of claim 4 wherein the additional vinyl compound is an ester of acrylic acid.

8. The process of claim 4 wherein the additional vinyl compound is an ester of methacrylic acid.

References Cited in the file of this patent

UNITED STATES PATENTS

| | | |
|---|---|---|
| 1,967,863 | Collins et al. | July 24, 1934 |
| 2,204,520 | Walker et al. | June 11, 1940 |
| 2,477,338 | Kirby et al. | July 26, 1949 |
| 2,482,073 | Stanton et al. | Sept. 13, 1949 |
| 2,615,009 | St. John et al. | Oct. 21, 1952 |
| 2,635,060 | Cheronis et al. | Apr. 14, 1953 |
| 2,686,764 | Geister et al. | Aug. 17, 1954 |
| 2,711,400 | Harrison et al. | June 21, 1955 |
| 2,721,145 | Cheronis | Oct. 18, 1955 |